Jan. 26, 1960   H. T. LANGE   2,922,292
VALVE ASSEMBLY FOR A REFRIGERATION SYSTEM
Filed May 3, 1956
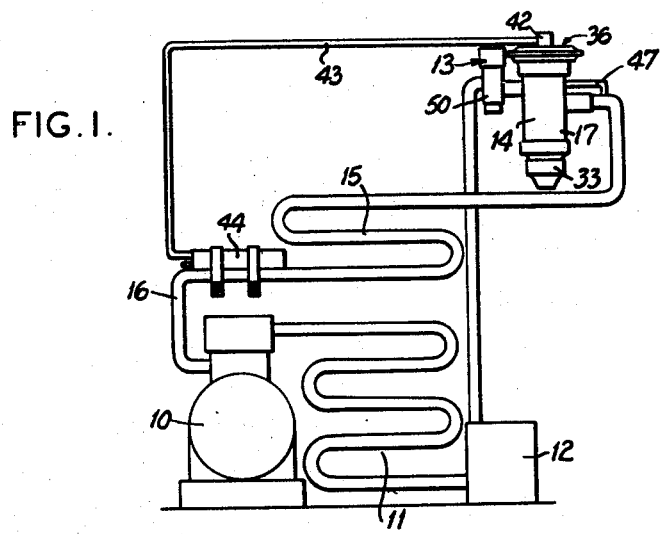
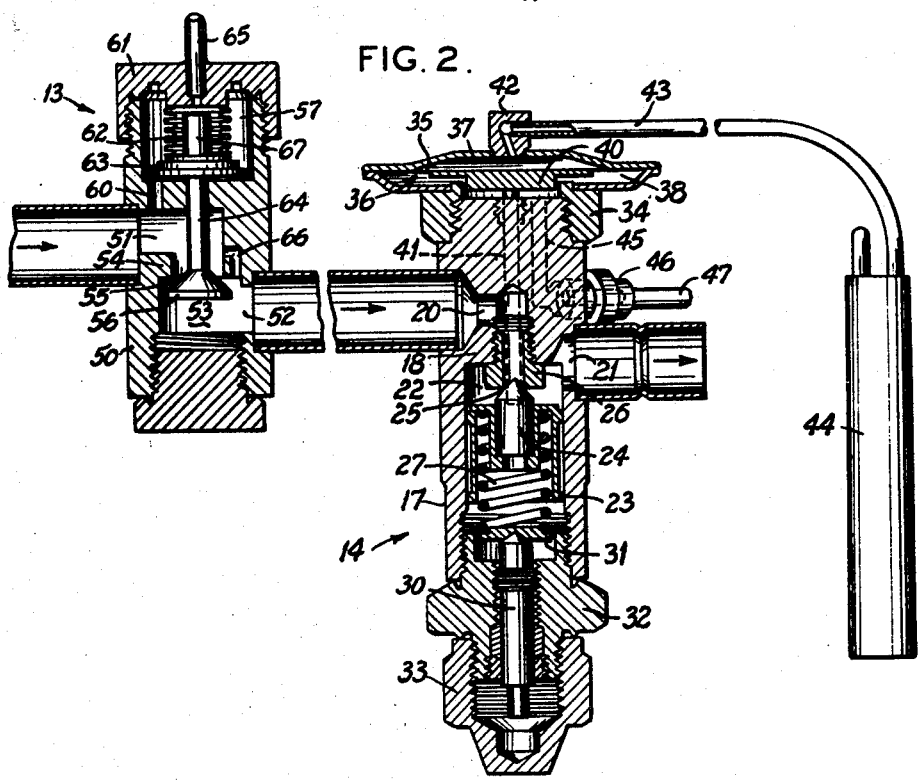
INVENTOR,
HAROLD T. LANGE
BY Terry and Cohn
ATTORNEYS.

United States Patent Office 2,922,292
Patented Jan. 26, 1960

2,922,292

VALVE ASSEMBLY FOR A REFRIGERATION SYSTEM

Harold T. Lange, Huntleigh Village, Mo., assignor to Sporlan Valve Company, St. Louis, Mo., a corporation of Missouri Application May 3, 1956, Serial No. 582,532

6 Claims. (Cl. 62—203)

This invention relates generally to improvements in a valve assembly for a refrigeration system, and more particularly to an arrangement of a compensating valve unit with a thermostatic expansion valve adapted to regulate the load on the compressor motor of such system.

In refrigerating systems of compressor-condenser-evaporator type, variations in condenser pressure are very slight where water cooled condensers are equipped with constant pressure type water regulators. However, the use of water conservation devices such as cooling towers, evaporator and particularly air cooled condensers induce conditions at widely fluctuating condenser pressures in a given system. Moreover, it is the trend for economic reasons to size the compressor motor even more closely. The practical result is that the overload protection formerly afforded by valves which maintain superheat control and maintain a predetermined maximum suction pressure despite the increases in suction temperature is no longer adequate, and further refinement is necessary in order to compensate for excessive condenser pressures and air temperatures.

It is an important objective of the present invention to provide a valve unit arranged in operative relation to a thermostatic expansion valve to regulate the capacity of such expansion valve incident to regulating the load on the compressor motor, the valve mechanisms cooperating functionally, yet being structurally independent so that the thermostatic expansion valve is free of vibration upon operation of the compensating valve unit.

Another important object is realized by the novel arrangement of the compensating valve unit with the thermostatic expansion valve in the refrigerant line so that there will be no limitation in or regulation of evaporator pressure, except that normal regulation afforded by the thermostatic expansion valve resulting from the response of the usual sensing unit located at the evaporator outlet, until the condenser pressure has reached a predetermined value.

Still another important objective is realized by the provision of a valve unit located in the refrigerant line immediately at one side of the thermostatic expansion valve which operates to regulate the capacity of the expansion valve upon increases of condenser pressure above a predetermined value.

Yet another important objective is achieved by the location of a compensating valve unit in the refrigerant line immediately at the inlet side of the thermostatic expansion valve, such valve unit having a valve element operable in response to increases of condenser pressure only above a predetermined pressure volume so that refrigerant is fed to the thermostatic expansion valve at a lower pressure and in a partially vaporized condition, thus regulating the compressor motor load.

Another important objective is realized by the provision of a permanent by-pass circumventing the valve element of the above described compensating valve unit, the by-pass being of a predetermined size to establish a maximum superheat, a minimum evaporator pressure and a minimum motor load.

Other advantages and objectives are realized by the provision of a flexible bellows connected to the valve element of the compensating valve unit, such bellows being subjected internally to a fixed charge of fluid of predetermined pressure and subjected externally to condenser pressure, and by the provision of a plug of predetermined size disposed internally of the bellows adapted to change the volume, and hence adapted to regulate the sensitivity of the valve element to such condenser pressure increases.

The foregoing and numerous other objects and advantages of the invention will more clearly appear from the following detailed description of a preferred embodiment, particularly when considered in connection with the accompanying drawing, in which:

Fig. 1 is a diagrammatic view of a refrigeration system embodying the improved valve assembly, and Fig. 2 is a longitudinal cross sectional view of the compensating valve unit and the thermostatic expansion valve shown in Fig. 1.

Referring now by characters of reference to the drawing, and first to Fig. 1, there is shown a diagrammatic view of a refrigeration system including a compressor-electric motor unit, generally referred to at 10, that delivers refrigerant to condenser 11 that is usually air cooled. The condenser 11 in turn delivers the refrigerant to a receiver 12, the refrigerant thence being delivered to a valve assembly including a compensating valve unit 13 and a thermostatic expansion valve 14, such valve assembly controlling the flow of refrigerant to an evaporator generally indicated at 15. As is usual in a system of this type, the evaporator 15 is connected through suction line 16 back to the inlet side of the compressor unit 10.

The thermostatic expansion valve 14 includes a body 17 forming an enclosure which is in the nature of a housing, casing or barrel. A partition 18 separates a passageway formed through body 17 to provide an inlet 20 and an outlet 21. Located below partition 18 is an outlet chamber 22 which communicates with outlet 21. Located and reciprocally movable within outlet chamber 22 is a valve guide 23 that constitutes a carriage for carrying a valve 24 operable to open and close a valve seat port 25. The valve port 25 is formed in a replaceable threaded element 26 fastened and located in partition 18. The valve 24 and valve seat port 25 cooperate to control the flow of refrigerant between inlet 20 and outlet 21. A spring 27 is located in outlet chamber 22, and is arranged to engage guide 23 so that the spring 27 acting through guide 23 tends to urge valve 24 toward a closed position.

The compressive force of spring 27 may be selectively adjusted by the manipulation of threaded stem 30, one end of which engages movable plate 31 forming an abutment for the lower end of spring 27. Stem 30 is threadedly carried by collar 32 fastened to body 17. A cap 33 is threadedly connected to the lower end of collar 32 and serves to enclose the lower end of stem 30.

A casing structure 34 is attached to the upper end of body 17, and includes a diaphragm 35 constituting a flexible movable element located in a diaphragm chamber generally indicated at 36. The diaphragm 35 divides chamber 36 into separate compartments 37 and 38. As a backing for diaphragm 35 there is employed a follower plate 40. Motion of the diaphragm 35 and follower plate 40 is imparted to guide 23, and hence to valve 24, through a plurality of push rods, only one of which is shown and indicated at 41 in dotted lines.

The upper compartment 37 of diaphragm chamber 36 is connected through fitting 42 and capillary tubing 43 to the bulb 44 located in thermal responsive relation to the outlet of evaporator 15. A limited fluid charge is introduced into bulb 44, and consists preferably of a fluid having characteristics approaching or identical with those of the refrigerant employed in the system, and will usually consist of Freon 12, Freon 22, methyl chloride or any other of the refrigerants selected for the system according to preference and field of usage. Below a predetermined temperature at the bulb 44, the charge is partly in liquid phase and partly in vapor phase, above this temperature all of this charge is in vapor phase.

The diaphragm 35 is capable of flexing action under the influence of fluid pressure changes occurring by reason of thermal effects imparted to bulb 44 in response to changes in superheat in the suction line 16. Motion of the diaphragm 35 and follower plate 40 is imparted to rods 41 and hence imparted to valve 24 through guide 23. It will be apparent that downward or opening valve movement is opposed by the action of the valve spring 27.

The foregoing description of the expansion valve is introduced for completeness, the structure as shown and described being substantially that of a unit of this type sold by Sporlan Valve Company of St. Louis, Missouri. The valve further includes a portion of a so-called equalizer passage, although in certain installations this may be omitted without effecting current improvements. When employed, the equalizer passage includes a bore 45 extending into chamber 38 below diaphragm 35, the bore 45 being continued outwardly of the body of the valve and connected by fitting 46 to tubing 47 communicating with the outlet end of evaporator 15. It will thus appear that the chamber 38 is subject at all times to pressure conditions existing at the evaporator outlet, which pressure tends to act in conjunction with the spring 27, and tends to bias valve 24 toward a closed position against its seat 25.

The compensating valve unit 13 includes a body 50 having an inlet 51 and an outlet 52 interconnected by a passageway 53. Valve 13 is connected in the refrigerant line immediately at one side of the thermostatic expansion valve 14, and in the preferred assembly shown in the drawings, the inlet 51 is connected to the refrigerant line coming from receiver 12 while the outlet 52 is connected by a relatively short section of refrigerant line to the inlet 20 of expansion valve 14.

The body of valve 13 is provided with a partition 54 in passage 53 which forms a valve seat 55 adapted to be opened and closed by valve element 56.

The valve body 50 is provided with a chamber 57 that is placed in communication with inlet 51 by bore 60. The otherwise open top of chamber 57 is closed by cap 61 threadedly attached to the upper end of body 50.

Located in chamber 57 is a bellows 62 constituting a flexible movable means, the upper end of bellows 62 being sealed and attached to closure cap 61 and the lower opposite end of bellows 62 being sealed and attached to a movable follower plate 63. A valve stem 64 interconnects valve element 56 with follower plate 63. A stub tube 65 is carried by closure cap 61 and is arranged in communication with the internal chamber of bellows 62, the tube 65 being utilized only for charging purposes and sealed off after introduction of the fluid content.

The bellows 62 is subjected internally to a fixed charge of fluid, preferably air, having a predetermined pressure sufficient to hold the valve element 56 in an opened position under normal operating conditions. The bellows 62 is subjected externally to condenser pressure since chamber 57 is in communication with inlet 51. The bellows 62 is connected to valve element 56 in a way that the valve closes when the bellows is compressed.

Since the bellows 62 is surrounded by a condenser pressure and since the charge of air inside bellows 62 is at a substantially constant predetermined pressure, when the condenser pressure increases above that of the air in bellows 62, the bellows compresses and closes the valve port 55. Moreover, since bellows 62 contain a fixed charge of air pressure, there will be no compression of the bellows at any refrigerant or condenser pressure below this value. Therefore, the valve will be open at all condenser pressures up to a predetermined value and will be closed gradually as the pressure increases above this point.

Thus when condenser pressure increases above a preset value, the valve element 56 begins to throttle and is fully closed at a predetermined pressure above the preset value. This throttling valve action decreases the pressure of the refrigerant fed to the inlet of the thermostatic expansion valve 14, and causes some of the refrigerant to vaporize so that the inlet of expansion valve 14 is fed a refrigerant having a lower pressure and comprising a mixture of liquid and vapor. The vapor has a relatively large volume compared to the liquid. The net result is a substantial decrease in the capacity of the thermostatic expansion valve 14, and increase in superheat at the evaporator outlet and a lower evaporator pressure, and consequently a lower compressor motor load.

The valve unit 13 includes a permanent by-pass 66 that circumvents the valve seat port 55 and cooperating valve element 56 and places the inlet 51 in communication with outlet 52 at all times. The by-pass 66 is of a predetermined size to allow enough refrigerant to pass, even if the throttling valve is completely closed, to establish a maximum superheat value and a minimum evaporator pressure, and hence establish a minimum motor load.

The sensitivity or pressure increase necessary to close fully the valve element 56 can be altered by changing the internal volume of bellows 62. If the bellows 62 is partially filled with a plug 67, the bellows will contain a relatively smaller volume of air. Thus when bellows 62 is compressed by increases of condenser pressure, the air pressure inside will increase rapidly and will resist further compression until the refrigerant or condenser pressure further increases. If, on the other hand, no internal plug 67 is used, then the bellows volume will be relatively greater and the same change in compression will result in a much smaller increase in internal air pressure, and therefore the bellows 62 will compress more for a given increase of liquid refrigerant or condenser pressure. In this manner a liquid refrigerant pressure range from fully open to fully closed position of valve element 56 could be varied for example, from ten pounds per square inch to one hundred pounds per square inch.

As explained above, the throttling or compensating valve unit 13 is preferably placed in the refrigerant line with the bellows 62 subjected externally to condenser pressure at the inlet side of thermostatic expansion valve 14. This arrangement will effect both a reduction in pressure and the introduction of vapor at the expansion valve port. However, the compensating valve unit 13 may also be placed in the refrigerant line with the bellows 62 subjected externally to pressure existing at the outlet side of expansion valve 14. This arrangement will result in a substantially constant pressure at the expansion valve port but will produce vapor in the refrigerant liquid and hence effect a partial reduction in expansion valve capacity.

By proper choice of the size of the by-pass 66, the size of valve port 55, and the cross sectional area, volume and stroke of the bellows 62, a wide range of compensation can be provided to the expansion valve 14. In this way, the refrigerating load on the compressor motor can be held constant with an increase in condenser pressure above a certain amount, or it can be made to decrease under a similar increase in condenser pressure, or it can be allowed to increase on increase in condenser pressure.

Although the improvements have been described by making particularized reference to a preferred structure of a compensating valve unit and its arrangement with a thermostatic expansion valve, the detail of description is not to be understood as restrictive, many variants being possible within the principles disclosed and within the fair scope of the claims hereunto appended.

I claim as my invention:

1. In a refrigerant system of compressor-condenser-evaporator type including a thermostatic expansion valve together with a thermal responsive device for actuating the expansion valve, a compensating valve mechanism located in the refrigerant line operatively ahead of said expansion valve, the valve mechanism including a body having an inlet and outlet and an interconnecting passageway therebetween, a valve element in said passageway regulating refrigerant flow therethrough, and a flexible movable means connected to said valve element, one side of said flexible means being subjected to a predetermined pressure that maintains the valve element in an open position under normal conditions, and the other side being subjected to condenser pressure, said flexible means being arranged to move said valve element toward the closed position in response to an increase in condenser pressure above said predetermined pressure, so that the refrigerant fed to the expansion valve is at a lower pressure and partially vaporized, whereby to regulate the load on the compressor motor, and a by-pass line circumventing the valve element, said by-pass line being of a size to feed refrigerant to said expansion valve when said valve element is closed to establish a maximum superheat, a minimum evaporator pressure and a minimum compressor motor load.

2. In a refrigerant system of compressor-condenser-evaporator type including a thermostatic expansion valve together with a thermal responsive device for actuating the expansion valve, a compensating valve mechanism connected in the refrigerant line at one side of said expansion valve, the valve mechanism including a body having an inlet and outlet and an interconnecting passageway therebetween, a valve element in said passageway regulating refrigerant flow therethrough, the body having a chamber in communication with said inlet, a flexible movable means disposed in said chamber and connected to said valve element, one side of said flexible means being subjected to a fixed charge of fluid having a pressure sufficient to hold the valve element in an open position under normal conditions, and the other side being subjected to condenser pressure on said inlet, said flexible means being arranged to move said valve element toward a closed position in response to an increase of condenser pressure above said predetermined pressure to reduce the pressure of the refrigerant fed to said expansion valve and to vaporize partially such refrigerant whereby to regulate the load on the compressor motor, a by-pass line in said body circumventing the valve element, the by-pass line being of a size to establish a maximum superheat, a minimum evaporator pressure and a minimum compressor motor load.

3. In a refrigerant system of compressor-condenser-evaporator type including a thermostatic expansion valve together with a thermal responsive device for actuating the expansion valve, a compensating valve mechanism connected in the refrigerant line immediately at the inlet side of said expansion valve, the valve mechanism including a body having an inlet and outlet and an interconnecting passageway therebetween, a valve element in said passageway regulating refrigerant flow therethrough, a flexible bellows connected to said valve element, a fixed charge of fluid internally of said bellows subjecting said bellows to a predetermined pressure sufficient to hold the valve element in an open position under normal conditions, said bellows being arranged to be subjected externally to condenser pressure, the bellows being arranged to move said valve element toward a closed position in response to an increase of a condenser pressure above said predetermined fluid pressure, a plug of predetermined size located internally of said bellows to change the internal volume of said bellows to regulate the sensitivity of said valve element to increases of condenser pressure, a by-pass passage in said body interconnecting the inlet and outlet of said valve mechanism, said by-pass passage being of a size to establish a maximum superheat, a minimum evaporator pressure and a minimum compressor motor load.

4. In a refrigerant system of compressor-condenser-evaporator type including a thermostatic expansion valve together with a thermal responsive device for actuating the expansion valve, a compensating valve mechanism connected in the refrigerant line immediately adjacent the inlet side of said expansion valve, the valve mechanism including a valve body having an inlet and outlet and an interconnecting passageway therebetween, the valve element in said passageway regulating refrigerant flow therethrough, the body having a chamber in communication with said inlet, a bellows disposed in the said chamber and connected to said valve element, a fixed charge of fluid located internally of said bellows having a pressure sufficient to hold the valve element in an open position under normal operating conditions, the bellows being subjected externally to condenser pressure, the bellows being arranged to move said valve element toward a closed position in response to an increase of condenser pressure above said predetermined fluid pressure so that the expansion valve is fed partially vaporized refrigerant at a lower pressure, thus resulting in a decrease in the capacity of the expansion valve, an increase in superheat at the evaporator outlet, a lower evaporator pressure and a lower compressor motor load, a plug of predetermined size located internally of said bellows to change the internal volume and hence change the sensitivity of the valve element to such increases of condenser pressure, a by-pass passage in said body circumventing the valve element, the by-pass passage being of a size to establish a maximum superheat, a minimum evaporator pressure and a minimum compressor motor load.

5. In a refrigerant system including a compressor, condenser, evaporator and a thermostatic expansion valve connected in the refrigerant line on the inlet side of said evaporator, together with a thermal responsive device for actuating the valve, said device including a fluid motor and a fluid-charged thermo-sensing unit located at the evaporator outlet, means translating fluid expansion within the sensing unit to the expansion valve for actuation of same, a separate compensating valve unit connected in the refrigerant line immediately adjacent the inlet to said expansion valve, said valve unit including a body having an inlet, an outlet and an innerconnecting passageway therebetween, a valve element in said passageway regulating refrigerant flow therethrough, and a flexible movable means connected to said valve element, a fixed charge of fluid located on one side of said flexible means having a predetermined pressure sufficient to hold the valve element in an open position under normal operating conditions, said flexible means being arranged to subject the other side to condenser pressure, said flexible means being arranged to move said valve element toward a closed position in response to an increase of condenser pressure above said predetermined fluid pressure on said flexible means so as to decrease the refrigerant pressure to the expansion valve inlet and cause such refrigerant to vaporize partially, and a bypass passage in said body circumventing said valve element, said bypass passage being of a size to feed a predetermined amount of refrigerant to said expansion valve at all times to establish a maximum superheat, a minimum evaporator pressure and a minimum compressor motor load.

6. The combination and arrangement of elements as recited in claim 5, but further characterized by the provision of a plug of predetermined size located on the side of said flexible means containing the fixed charge of fluid to change the volume occupied by said fluid charge, and hence to regulate the sensitivity of the valve element to increases of condenser pressure above such predetermined fluid pressure on one side of said flexible means.

References Cited in the file of this patent
UNITED STATES PATENTS
2,614,393    Schulz et al. _____ Oct. 21, 1952